April 1, 1930.   C. T. RAULE   1,752,542
DRIVE FOR HIGH SPEED SPINDLES
Filed Oct. 7, 1926
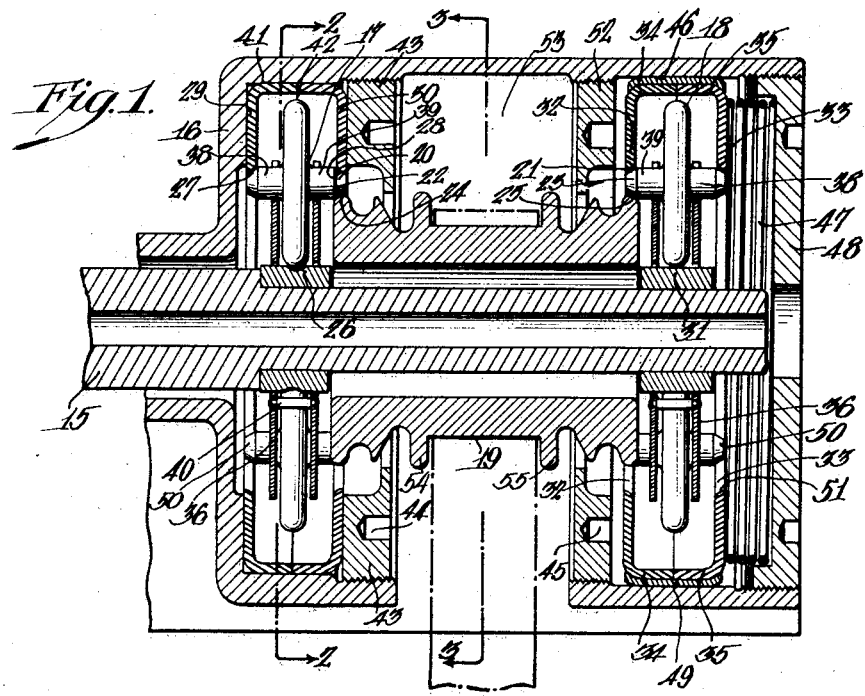
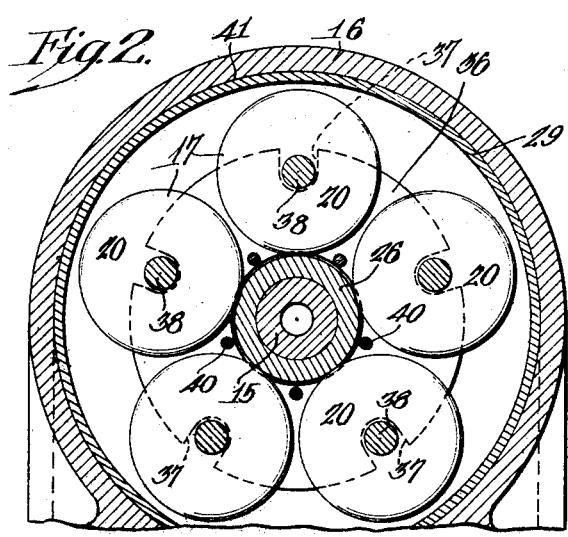
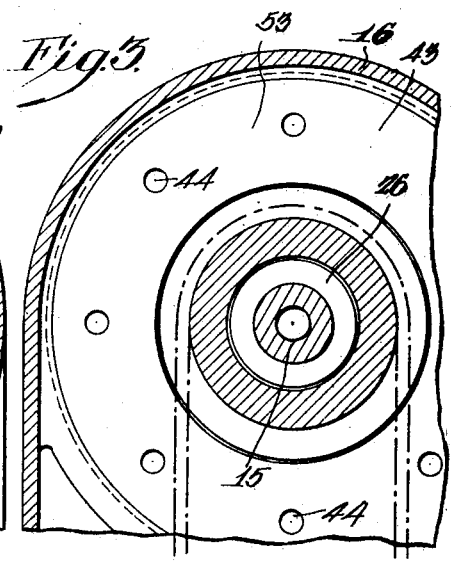
Inventor
Clifford T. Raule
by
Attorney Patented Apr. 1, 1930

1,752,542

UNITED STATES PATENT OFFICE

CLIFFORD T. RAULE, OF BROOKLINE, PENNSYLVANIA

DRIVE FOR HIGH-SPEED SPINDLES

Application filed October 7, 1926. Serial No. 140,036.

My invention relates to a low-friction drive and bearing support for shafts and spindles adapted to advantageous use with shafts and spindles revolving at any speed but particularly advantageous with shafts and spindles that have to revolve at extremely high speeds.

The main purpose of my invention is to impart high speed to a spindle with a low speed belt action.

A further purpose is to drive a spindle by rolling engagement with the axles of wheel-and-axle rollers that give the spindle roller support.

A further purpose is to support a driving pulley for a spindle between spaced sets of wheel-and-axle roller bearings supporting the spindle, applying opposite ends of the pulley to the axles of the rollers to drive the rollers and driving the spindle from the wheels of the rollers.

A further purpose is to support a revolving spindle by spaced sets of wheel-and-axle rollers and their interior and exterior races, the wheels rolling around the outside of the interior races which are on the spindle and the axles rolling around the inside of stationary exterior races and to drive the spindle through the rollers by means of a driving pulley supported by rolling engagement with the opposite ends of the axles of the two sets.

Further purposes will appear in the specification and in the claims.

I prefer to illustrate my invention with one only of its different forms selecting a form that is efficient and practical in operation, and which illustrates particularly well the principles involved.

Figure 1 is a longitudinal vertical section illustrating my invention applied to a high-speed spindle.

Figures 2 and 3 are sections of Figure 1 taken upon the lines 2—2 and 3—3 respectively in the direction of the arrows.

Like numerals refer to like parts in all figures.

My invention described herein might be considered from one standpoint to be a reversal of a high-speed bearing invented by me and for which an application is copending herewith, Serial No. 140,033, filed October 7, 1926. The outer race of the bearings is in a fixed part engaging the rotary members near to the axes of their rotation and the shaft race bears against the members farther from these axes. In the present invention the part carrying the outer race becomes a driver permitting relatively low speed belt driving for a very high speed shaft.

Describing in illustration, and not in limitation, and referring to the figures:—

In the structure of Figures 1 to 3 a high-speed spindle 15 is supported within a stationary housing 16 by spaced sets 17 and 18 of wheel-and-axle roller bearings and the spindle is driven through the wheel-and-axle rollers by a driving pulley 19, opposing taper ends 20 and 21 of the spaced sets of rollers 22 and 23 making circumferential rolling and supporting engagement with opposite ends 24 and 25 of the pulley.

The rollers 22 make rolling wheel engagement with the outside of the interior race 26 fastened coaxially to the spindle and make axle rolling engagement with the inside of the taper race surfaces 27 and 28 of the race members 29 and 30, and the rollers 23 of the other set of bearings make wheel engagement with the outside of the interior race 31 mounted upon the spindle and rolling engagements with the inside of the taper race surfaces 32 and 33 of the outer race members 34 and 35.

In each set of bearings the wheel-and-axle units are spaced circumferentially around the race by means of spacer plates 36 upon opposite sides of the wheels. These plates are notched at 37 to receive the oppositely directed axles 38 and 39 and riveted together at 40. The housing 16 is shown bored at 41 to receive the outer race members 29 and 30 which are relatively split at 42 and held to place by means of annular sleeve 43 threaded into the housing against the outer race member 30.

Holes are shown at 44 and 45 for spanner engagement.

The outer race members 34 and 35 are adapted to slide longitudinally within a larger bore 46 in the right-hand end of the housing 16 and are strongly pressed to the left by means of a spring 47 compressed between an annular sleeve 48 threaded into the end of the housing and the outer race member 35.

In the illustration the outer race members 34 and 35 are of the same size as the outer race members 29 and 30 and as the bore 46 is larger than the bore 41 a filler sleeve 49 is shown to fill in the space between the interior of the housing and the outside of the race members.

The bearing ends 50 of the axles are tapered. These taper surfaces roll around the inside of bearing surfaces 51 of the outer races.

Preferably either the taper of the end of the axle or that of the outer race surface, or both of these surfaces, should be convex in order that the bearing friction may be one of pure rolling instead of part rolling and part sliding as would be the case if the taper surfaces of the outer raceways fit the taper surfaces of the ends of the axles.

The driving pulley 19 is supported at each end by the taper ends of the circumferentially spaced axles and limits the inward position of the right-hand set of bearings, which is pressed by spring 47 so that the taper ends of the axles at 21 make firm engagement with the end 25 of the pulley.

This longitudinal pressure tends to telescope the bearings with respect to one another, the telescoping movement being stopped by engagement between the circumferences of the wheels with the interior races and the circumferences of the outer ends of the axles with exterior races and results in firm contact between the circumferences of the interior races and of the wheels.

An annular sleeve 52 is shown between the right-hand outer raceway and the interior space 53 around the driving pulley. This sleeve functions chiefly as a guard.

Radial flanges 54 and 55 are shown on the driving pulley to maintain a driving belt in its proper central position.

In operation the pulley 19 is driven by any suitable belt not shown. The pulley is supported solely upon the rolling axle ends 20 and 21 of the spaced sets of rollers.

The rolling engagement between the ends of the pulley and the taper ends of the axles drives the spaced sets of rollers which in turn by wheel engagement with the races 26 and 31 drive the spindle. The outer races are stationary and the engagement between the driving pulley and the ends of the axles of the rollers is around the outside of the respective ends of the driving pulley.

In order to hold the shaft against longitudinal movement one of the shaft bearings is given a slight hollow, i. e., is made "radial", fixing the location of the shaft by the rotating and revolving driving wheels.

The pulley and the shaft are both supported from the driving wheels or devices which, in turn, are held by the fixed races.

In view of my invention and disclosure variations and modifications to meet individual whim or particular need will doubtless become evident to others skilled in the art, to obtain part or all of the benefits of my invention without copying the structure shown, and I, therefore, claim all such in so far as they fall within the reasonable spirit and scope of my invention.

Having thus described my invention what I claim as new and desire to secure by Letters Patent is:—

1. In a drive for a spindle, a spindle, a pulley about the spindle, a set of wheel-and-axle roller bearings spaced about the spindle between it and the pulley making rolling engagement with the spindle and rolling axle engagement with the pulley and a fixed bearing member cooperating with the axle.

2. In a drive for a spindle, a spindle, a pulley about the spindle, a set of wheel-and-axle roller bearings spaced about the spindle between it and the pulley making rolling wheel engagement with the spindle and rolling axle engagement with an exterior circumference of the pulley and a fixed bearing member cooperating with the axle.

3. A spindle, a driving pulley, sets of wheel-and-axle roller bearings therefor, the axles engaged by the pulley and the wheels engaging the spindle, a fixed cooperating bearing for the axles and means for resiliently maintaining driving contact between the pulley and the axles.

4. A spindle, an inner race carried thereon, an outer stationary race, a driving pulley and wheel-and-axle rollers having wheels making rolling engagement with the inner race, and axles making rolling engagement with the inside of the outer races and with the outside of the pulley.

5. A spindle, a spaced pair of inner races mounted on the spindle, a pair of stationary outer races for each inner race, a set of wheel-and-axle roller bearings spaced around each inner race having taper axles and making rolling wheel engagement with the inner race and rolling axle engagement with the inside of the respective outer races, and a driving pulley having circumferential supporting engagement with the taper ends of the axles of each set adapted to drive the spindle through the rolling engagement with the taper ends of the axles.

6. In a high speed drive, a rotatable shaft, bearings for the shaft, a driving pulley for the shaft mounted upon the bearings and surrounding the shaft and a fixed track for a part of the rotatable bearings.

7. In a high speed bearing, a shaft, spaced pairs of fixed annular bearings about the shaft, members rolling upon the pairs of annular bearings on the outside and forming bearings for the shaft on the inside and a pulley carried by the rolling members and engaging said members at points of smaller diameter than the points of engagement of the members with the shaft.

8. In a high speed shaft drive, a pair of interior spaced fixed annular bearings, a plurality of rolling bearing members engaging therewith and having bearing surfaces between the annular bearings, a shaft engaging the bearing surfaces and driven by them and driving means engaging the exteriors of the rolling bearing members to rotate them.

9. In a high speed drive, a drive pulley, rotatable and revoluble bearing members forming sets surrounding the pulley, one set at each end of the pulley and driven by the pulley, outside fixed annular races for the bearing members and a shaft surrounded by bearing members making bearing engagement with the bearing members at diameters greater than the diameters at which engagement is had between them and the pulley on the one hand and the races on the other.

10. In a high speed bearing, a driving pulley, a shaft coaxial with the pulley and revoluble driving connections between the pulley and the shaft, radially engaged by the pulley and by the shaft on the inside, and a housing restraining the driving connections on the outside, thus supporting the shaft and giving inwardly directed bearing support to the pulley.

11. In a high speed bearing a driving pulley, a shaft coaxial with the pulley and revoluble driving connections between the pulley and the shaft, radially engaged by the pulley and by the shaft on the inside, and a housing restraining the driving connections on the outside, thus maintaining the pulley against movement transverse to its axis and giving inwardly directed bearing support to the pulley.

12. In a high speed bearing, a driving pulley, a shaft coaxial with the pulley and revoluble driving connections between the pulley and the shaft, radially engaged by the pulley and by the shaft on the inside, and a housing restraining the driving connections on the outside, thus supporting the shaft and maintaining the pulley in its driving relation to the shaft and giving inwardly directed bearing support to the pulley.

13. In a high speed bearing, a shaft, a plurality of revoluble rotary driving and bearing members radially engaging with the shaft, bearings for the members and rotary means engaging, receiving support from and imparting motion to inwardly directed surfaces of said members to rotate the members.

14. A rotatable shaft, a radial bearing thereon, a pair of spaced interior fixed bearing races of larger diameter than the shaft, and wheels located between the radial bearing and the races having bearing surfaces of different diameters engaging the shaft along bearing surfaces of largest diameter and engaging the fixed bearing races along lines of smaller diameter, to rotate and to revolve about the shaft and a driving pulley engaging the wheels along lines of smaller diameter than their engagement with the shaft.

15. A rotatable shaft, a radial bearing thereon, a pair of spaced interior fixed bearing races of larger diameter than the shaft and wheels located between the radial bearing and the races having bearing surfaces of different diameters engaging the shaft along bearing surfaces of largest diameter and engaging the races along lines of smaller diameter, to rotate and to revolve about the shaft and a driving pulley engaging the wheels along lines of smaller diameter than their engagement with the shaft, the same diameter as that of engagement with the fixed races.

16. In a high speed drive, a shaft, a pair of driving bearings each comprising spaced outside races, rollers having end portions of reduced diameter rolling upon the insides of the races and presenting each a portion of relatively large diameter against the shaft, a driving pulley between the bearings and having tapered outside engagement with the rotatable rollers and spring means for resiliently pressing the one driving bearing toward the other to tighten the driving connection between the driving pulley and the wheels.

17. In a high speed bearing, a rotatable shaft, a pair of bearings thereon of which one is radial, a set of bearing wheels engaging with each of the bearings on the shaft, a fixed raceway having tapered bearing connection with the wheels, a driving pulley supported upon and engaging the wheels and spring means for taking up play to maintain the parts in driving connection.

18. In a high speed bearing, a shaft, a radial bearing race rotatable with the shaft, a plain bearing rotatable with the shaft and spaced from the radial bearing, a plurality of rotatable and revoluble driving and bearing members engageable with each race, means for adjusting the distances between these bearing members to take up wear, exterior bearings for the bearing members and driving mechanism located between the bearing members for rotating them and driving the shaft.

19. In a high speed bearing, a shaft, a radial bearing race rotatable with the shaft, a plain bearing, rotatable with the shaft and spaced from the radial bearing, a plurality of rotatable and revoluble driving and bearing members engageable with each race, means for adjusting the distances between these bearing members to take up wear, fixed races for the bearing members and driving means for rotating the bearings, shiftable with adjustment of the distance between the bearing members.

20. In a high speed bearing, a shaft, a radial bearing race rotatable with the shaft, a plain bearing rotatable with the shaft and spaced from the radial bearing, a plurality of rotatable and revoluble driving and bearing members engageable with each race, means for adjusting the distances between these bearing members to take up wear, fixed races for the bearing members and a pulley engaging the bearing members and driving them.

21. In a high speed drive, a shaft, a roller bearing comprising an inner race on the shaft, a set of rollers engaging the inner race around a non-cylindrical surface thereof and an outer race presenting non-cylindrical inwardly directed surfaces against outwardly directed non-cylindrical surfaces of the rollers near opposite ends thereof, a second roller bearing spaced along the shaft from the first and including a second inner race on the shaft, a second set of rollers spaced around the second inner race and a second outer race presenting non-cylindrical inwardly directed surfaces against outwardly directed non-cylindrical surfaces of the second set of rollers near the opposite ends thereof, the second outer race and its rollers being adapted to movement axially of the shaft, in combination with a pulley having outwardly directed non-cylindrical surfaces at its opposite ends receiving roller support upon inwardly directed non-cylindrical surfaces of the opposing sets of rollers and means for pressing the second outer race toward the first.

22. In a high speed drive, a shaft, a roller, bearing comprising an inner race on the shaft, a set of rollers engaging the inner race around a non-cylindrical surface thereof and an outer race presenting non-cylindrical inwardly directed surfaces against outwardly directed non-cylindrical surfaces of the rollers near opposite ends thereof, a second roller bearing spaced along the shaft from the first and including a second inner race, a second set of rollers spaced therearound and a second outer race presenting non-cylindrical inwardly directed bearing surfaces against outwardly directed non-cylindrical surfaces of the rollers of the second set near opposite ends thereof, in combination with a pulley having outwardly directed non-cylindrical surfaces at its opposite ends receiving roller support upon inwardly directed non-cylindrical surfaces of the opposing sets of rollers.

23. In a high speed drive, a shaft, a roller bearing comprising an inner race on the shaft, a set of rollers engaging the inner race around a non-cylindrical outwardly directed surface thereof and an outer race presenting non-cylindrical inwardly directed surfaces against outwardly directed non-cylindrical surfaces of the rollers near axially opposite ends thereof, a second roller bearing spaced along the shaft from the first and including a second inner race, a second set of rollers spaced therearound and a second outer race presenting non-cylindrical inwardly directed bearing surfaces against outwardly directed non-cylindrical surfaces of the rollers of the second set near axially opposite ends thereof, in combination with a pulley having outwardly directed non-cylindrical surfaces at its opposite ends receiving roller support upon inwardly directed non-cylindrical surfaces of the opposing sets of rollers and means for moving one pair of races and its rollers bodily to tighten up the bearings.

24. In a high speed drive a shaft, a pulley surrounding the shaft and fixed internal bearings surrounding the shaft in combination with rollers having engaging surfaces of different diameters, the surfaces of smaller diameters supporting the pulley on one side of the surfaces and engaged by the bearings on the opposite side of the surfaces and the surfaces of larger diameter engaging the shaft to drive the shaft.

CLIFFORD T. RAULE.